United States Patent
Kogane et al.

(10) Patent No.: US 8,514,281 B2
(45) Date of Patent: Aug. 20, 2013

(54) IMAGING DEVICE THAT CHANGES A MASK REGION IN AN IMAGE ACCORDING TO A MAGNIFICATION SHIFT

(75) Inventors: Haruo Kogane, Kanagawa (JP); Yasuji Nakamura, Kanagawa (JP); Yoshinori Ootsuna, Kanagawa (JP)

(73) Assignee: Panasonic Corporation, Osaka (JP)

( * ) Notice: Subject to any disclaimer, the term of this patent is extended or adjusted under 35 U.S.C. 154(b) by 290 days.

(21) Appl. No.: 12/995,548

(22) PCT Filed: Jul. 31, 2009

(86) PCT No.: PCT/JP2009/003638
§ 371 (c)(1),
(2), (4) Date: Dec. 1, 2010

(87) PCT Pub. No.: WO2010/013486
PCT Pub. Date: Feb. 4, 2010

(65) Prior Publication Data
US 2011/0074978 A1    Mar. 31, 2011

(30) Foreign Application Priority Data
Aug. 1, 2008    (JP) ................................. 2008-199533

(51) Int. Cl.
G06K 9/00    (2006.01)
H04N 7/18    (2006.01)

(52) U.S. Cl.
USPC ........ 348/143; 348/240.3; 382/282; 382/283; 382/118

(58) Field of Classification Search
None
See application file for complete search history.

(56) References Cited

U.S. PATENT DOCUMENTS

| 6,067,399 | A  | * | 5/2000 | Berger | 386/280 |
|---|---|---|---|---|---|
| 6,509,926 | B1 | * | 1/2003 | Mills et al. | 348/143 |
| 6,744,461 | B1 |   | 6/2004 | Wada |  |
| 6,959,099 | B2 | * | 10/2005 | Gutta et al. | 382/100 |
| 7,423,667 | B2 | * | 9/2008 | Hayasaka | 348/143 |
| 7,847,837 | B2 |   | 12/2010 | Ootsuna |  |

(Continued)

FOREIGN PATENT DOCUMENTS

EP    1 708 494    10/2006
JP    59-107310    6/1984

(Continued)

OTHER PUBLICATIONS

Extended European Search Report dated Feb. 24, 2012.

*Primary Examiner* — John Villecco
*Assistant Examiner* — Dwight C Tejano
(74) *Attorney, Agent, or Firm* — Dickinson Wright PLLC

(57) ABSTRACT

There is provided an imaging apparatus which can prevent a privacy zone from being shifted from a mask when a magnification converting lens is switched. The imaging unit (3) has an extender (29) which is a magnification converting lens capable of switching between an inserted state and an extracted state with respect to an optical axis. The signal processing circuit (5) composites a mask to an object region of the privacy zone in the image generated by the imaging unit (3). The control unit (13) controls the signal processing circuit (5) according to switching of the extender (29). When the extender (29) is switched, the control unit (13) instructs the signal processing circuit (5) to change the mask region in the image according to the magnification shift caused by the switching of the extender (29) and maintains the privacy zone in a masked state after the signal processing circuit (5) is switched.

19 Claims, 12 Drawing Sheets

(56) References Cited

U.S. PATENT DOCUMENTS

| | | | |
|---|---|---|---|
| 8,300,899 B2 * | 10/2012 | Masuda | 382/118 |
| 2003/0137589 A1 | 7/2003 | Miyata | |
| 2004/0239785 A1 * | 12/2004 | Nanjo et al. | 348/294 |
| 2005/0117023 A1 * | 6/2005 | Seo | 348/207.99 |
| 2005/0129272 A1 * | 6/2005 | Rottman | 382/103 |
| 2005/0151875 A1 * | 7/2005 | Idemura | 348/360 |
| 2006/0045381 A1 * | 3/2006 | Matsuo et al. | 382/276 |
| 2006/0056056 A1 | 3/2006 | Ahiska | |
| 2007/0085915 A1 * | 4/2007 | Ootsuna et al. | 348/240.3 |
| 2007/0160349 A1 | 7/2007 | Hayashi | |
| 2008/0036877 A1 | 2/2008 | Arima | |
| 2008/0180538 A1 * | 7/2008 | Jung et al. | 348/222.1 |
| 2009/0207269 A1 * | 8/2009 | Yoda | 348/222.1 |
| 2009/0262987 A1 * | 10/2009 | Ioffe et al. | 382/118 |
| 2009/0279798 A1 * | 11/2009 | Massimino | 382/235 |
| 2011/0150327 A1 * | 6/2011 | Yoo et al. | 382/165 |

FOREIGN PATENT DOCUMENTS

| | | |
|---|---|---|
| JP | 02-237778 | 9/1990 |
| JP | 06-178183 | 6/1994 |
| JP | 08/051611 | 2/1996 |
| JP | 10-191306 | 7/1998 |
| JP | 2001-069494 | 3/2001 |
| JP | 2003-219414 | 7/2003 |
| JP | 2005-109724 | 4/2005 |
| JP | 2005-202263 | 7/2005 |
| JP | 2006-030680 | 2/2006 |
| JP | 2006-304122 | 11/2006 |
| JP | 2007-166042 | 6/2007 |

* cited by examiner

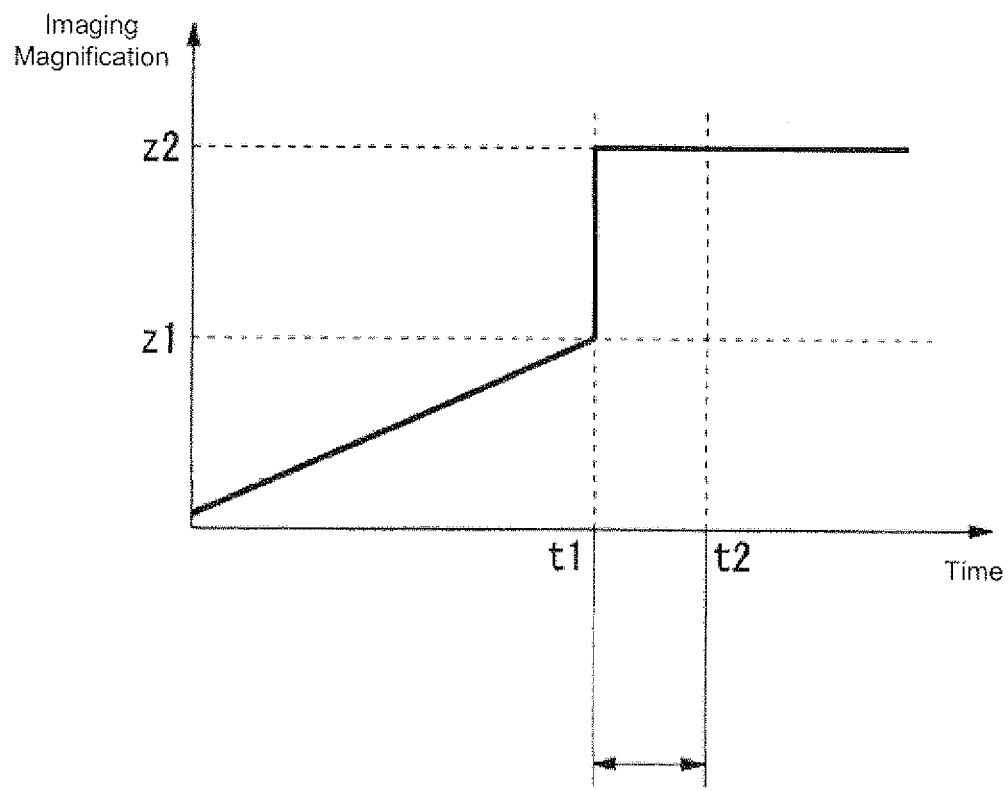

IMAGING DEVICE THAT CHANGES A MASK REGION IN AN IMAGE ACCORDING TO A MAGNIFICATION SHIFT

RELATED APPLICATIONS

This application claims the benefit of Japanese Patent Application No. 2008-199533, filed in Japan Aug. 1, 2008, which is hereby incorporated by reference herein in its entirety.

TECHNICAL FIELD

The present invention relates to an imaging apparatus having a magnification converting lens capable of switching between an inserted state and an extracted state with respect to an optical axis.

BACKGROUND ART

Conventionally, there has been known an imaging apparatus having a magnification converting lens in addition to a variable power lens. The variable power lens is a lens which continuously changes magnification by moving the lens in an optical axis direction and is exemplified by an optical zoom lens. In contrast to this, the magnification converting lens is a lens which discontinuously shifts magnification by inserting into and extracting from the optical axis and is typically called an extender. The magnification converting lens includes an enlarged type and a reduced type, which are called a teleconverter and a wide-converter respectively.

The enlarged-type magnification converting lens is useful in imaging at high magnification. When the magnification is low, the magnification converting lens is extracted, and in that state, the magnification is adjusted by the variable power lens. When the magnification is increased and only the variable power lens is not sufficient for magnification, the magnification converting lens is inserted for imaging at high magnification. For example, such a technique is disclosed in Japanese Patent Laid-Open No. 2005-202263.

Meanwhile, in a security camera, and like, a mask (masks) may be composited to a privacy zone (zones) in an image for privacy protection. The privacy zone is, for example, a private home. For example, mask data representing a predetermined privacy zone is preliminarily stored in the imaging apparatus. Based on the mask data, a mask is composited to a privacy zone of an imaging image and the image in the privacy zone is hidden. For example, such a technique is disclosed in Japanese Patent Laid-Open No. 2001-69494.

However, the conventional imaging apparatus has a problem in that when the imaging magnification is discontinuously changed by switching the magnification converting lens, the angle of view is greatly changed, the mask is shifted from the privacy zone, the privacy zone extends beyond the mask, and the part to be hidden may be revealed. For example, when the imaging magnification is increased by inserting the extender, the angle of view is narrowed, the privacy zone is enlarged and moved relatively to the image, and the image may be shifted from the mask.

SUMMARY OF INVENTION

Technical Problem

In view of the above background, the present invention has been made, and an object of the present invention is to provide an imaging apparatus capable of preventing a privacy zone from being shifted from a mask when a magnification converting lens is switched.

Solution to Problem

An imaging apparatus of the present invention comprises: an imaging unit having a magnification converting lens capable of switching between an inserted state and an extracted state with respect to an optical axis; a signal processing unit which composites a mask to an object region of a privacy zone in an image generated by the imaging unit; and a control unit which controls the signal processing unit according to switching of the magnification converting lens, wherein when the magnification converting lens is switched, the control unit instructs the signal processing unit to change the mask region in the image according to a magnification shift caused by the switching of the magnification converting lens and maintains the privacy zone in a masked state after the switching of the magnification converting lens.

Another aspect of the present invention is an imaging method for imaging an image by an imaging unit having a magnification converting lens capable of switching between an inserted state and an extracted state with respect to an optical axis, and compositing a mask to an object region of a privacy zone in the image generated by the imaging unit, wherein when the magnification converting lens is switched, the mask region in the image is changed according to a magnification shift caused by the switching of the magnification converting lens, and the privacy zone is maintained in a masked state after the switching of the magnification converting lens.

Advantageous Effects of Invention

As described above, the present invention changes the mask region in the image according to a magnification shift caused by the switching of the magnification converting lens and maintains the privacy zone in a masked state after the switching of the magnification converting lens. This can prevent the privacy zone from being shifted from the mask when the magnification converting lens is switched.

As described below, the present invention has other aspects. Accordingly, the disclosure of the present invention is intended to provide some aspects of the present invention, but not intended to limit the scope of the invention described and claimed herein.

BRIEF DESCRIPTION OF DRAWINGS

FIG. 6A is another drawing describing the operation of the imaging apparatus during switching.

DESCRIPTION OF EMBODIMENTS

Figure 1:
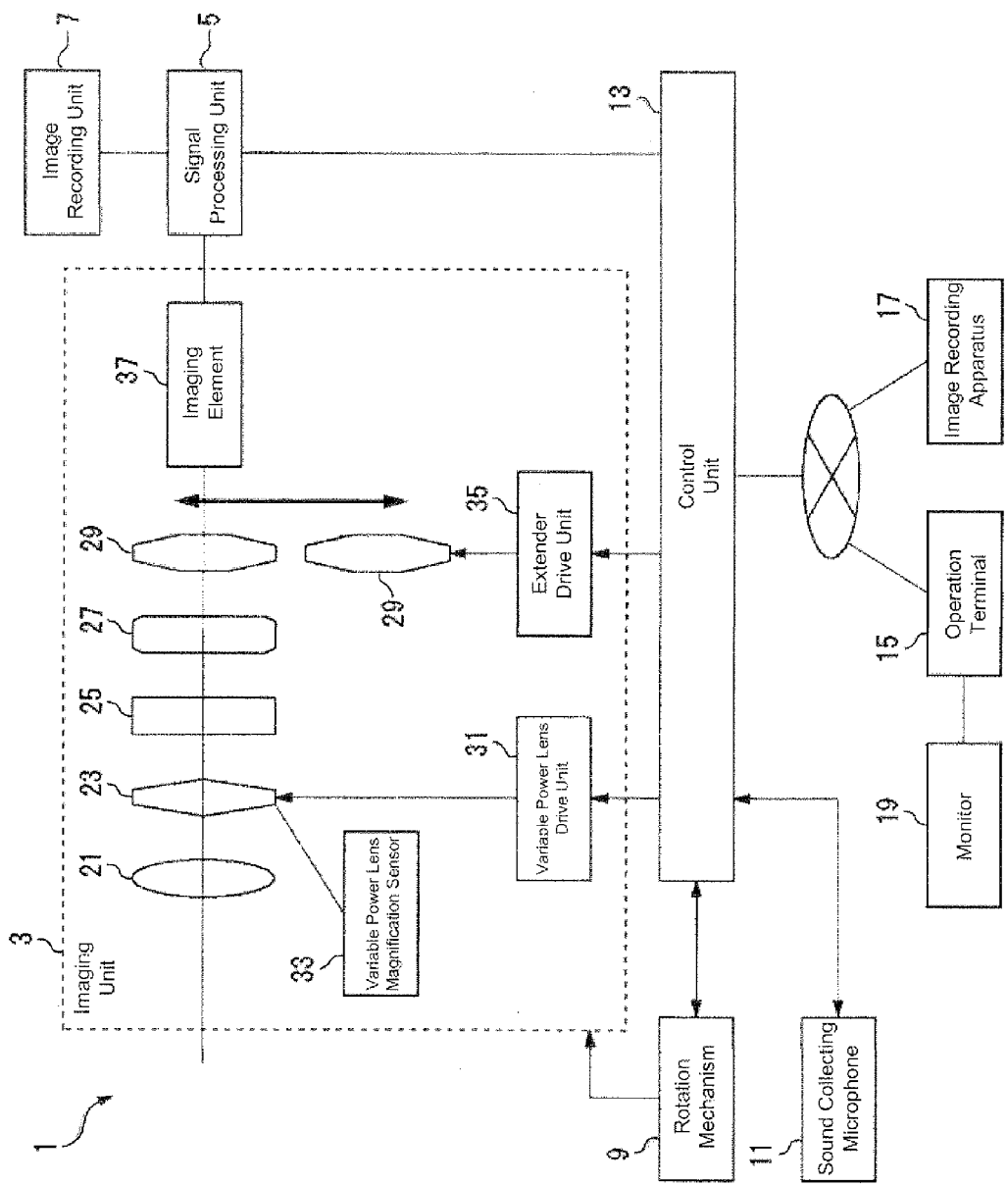
FIG. 1 is a block diagram of an imaging apparatus according to an embodiment of the present invention.

Hereinafter, the present invention is described in detail. Note that the following detailed description and the accompanying drawings do not limit the invention. Instead, the scope of the invention is defined by the accompanying Claims.

An imaging apparatus of the present invention comprises: an imaging unit having a magnification converting lens capable of switching between an inserted state and an extracted state with respect to an optical axis; a signal processing unit which composites a mask to an object region of a privacy zone in an image generated by the imaging unit; and a control unit which controls the signal processing unit according to switching of the magnification converting lens, wherein when the magnification converting lens is switched, the control unit instructs the signal processing unit to change the mask region in the image according to a magnification shift caused by the switching of the magnification converting lens and maintains the privacy zone in a masked state after the switching of the magnification converting lens.

The above configuration allows the mask region in the image to be changed according to a magnification shift caused by the switching of the magnification converting lens so as to maintain the privacy zone in a masked state after the switching of the magnification converting lens, thereby preventing the privacy zone from being shifted from the mask when the magnification converting lens is switched.

Moreover, the imaging apparatus of the present invention may further comprise a rotation mechanism which rotates the imaging unit, wherein when the magnification converting lens is switched during rotation of the imaging unit, the control unit instructs the signal processing unit to change a position and a size of the mask region according to an imaging direction change and the magnification shift and maintains an object region to be masked before and after the switching of the magnification converting lens.

The above configuration allows the position and the size of the mask region to be appropriately adjusted if the size and the position of the privacy zone is changed due to the switching of the magnification converting lens during rotation of the imaging unit. Thus, the above configuration can prevent the privacy zone from being shifted from the mask when the magnification converting lens is switched.

Further, in the imaging apparatus of the present invention, when the magnification converting lens is switched, the control unit may instruct the signal processing unit on the imaging magnification and the imaging direction after the switching of the magnification converting lens, and the signal processing unit may calculate, as the mask region, a relative region of the privacy zone to an imaging region after the switching of the magnification converting lens from the imaging magnification and the imaging direction instructed by the control unit and may composite the mask to the calculated mask region.

The above configuration can prevent the privacy zone from being shifted from the mask by appropriately changing the mask region when the magnification converting lens is switched.

Moreover, the imaging apparatus of the present invention may further comprise an image recording unit which records an image imaged by the imaging unit, wherein the control unit may control the signal processing unit in such a manner that during switching of the magnification converting lens, an image recorded in the image recording unit before the switching is outputted as an interpolated image and mask movement is restricted in the interpolated image according to the rotation of the imaging unit by the rotation mechanism.

In the above configuration, during switching of the magnification converting lens, an image recorded in the image recording unit before the switching is outputted as an interpolated image. This can prevent an image taken by the magnification converting lens from being outputted and thus can output a natural image not providing the user with a feeling of strangeness. Further, the restriction of the mask movement in the interpolated image according to the rotation of the imaging unit can prevent the mask from being shifted from the privacy zone of the interpolated image.

Further, in the imaging apparatus of the present invention, the control unit may change a size of the mask region a predetermined transient period earlier or later than the switching timing of the magnification converting lens in such a manner that the size of the mask region is larger than the size of the object region of the privacy zone.

The above configuration allows the size of the mask region to be surely larger than the size of the object region of the privacy zone and thus the privacy zone can be surely covered with the mask. As the transient size change process before or after the switching timing, in order to increase the magnification by switching the magnification converting lens, the mask region size is increased at a predetermined time (transient period) earlier than that of the switching. In other word, the mask region is enlarged, and after a predetermined time elapses, the lens switching starts. The predetermined time refers to a time corresponding to, for example, a predetermined number of frames, and may be one frame of time. Meanwhile, in order to reduce the magnification by switching the magnification converting lens, the mask region size is reduced after a predetermined time (for example, a time corresponding to a predetermined number of frames, and may be one frame of time) elapses from the switching completion.

Further, in the imaging apparatus of the present invention, the control unit may be configured such that when the magnification converting lens is switched during rotation of the imaging unit, the rotation speed of the imaging unit by the rotation mechanism is changed according to the magnification shift so as to maintain an object movement speed in the image before and after the magnification converting lens is switched.

The above configuration makes, regardless of the presence or absence of the magnification converting lens, an operational feeling when rotating the imaging unit equal, and makes the operation easy. In the above configuration, when the angle of view is changed due to a magnification shift, the rotation speed of the imaging unit may be changed in proportion to the angle of view, namely, in inverse proportion to magnification.

Moreover, in the imaging apparatus of the present invention, the imaging unit may further comprise a variable power lens which continuously changes imaging magnification, and the control unit may be configured in such a manner that when the magnification converting lens is switched during magnification change of the variable power lens, a magnification change speed of the variable power lens is changed according to the magnification shift so as to maintain the object size change speed in the image before and after the magnification converting lens is changed.

The above configuration allows the user to feel equally easy to perform a magnification change operation regardless of the presence or absence of the magnification converting lens. In the above configuration, when the angle of view is changed due to a magnification shift, the magnification change speed may be changed in proportion to the angle of view, namely, in inverse proportion to magnification.

Moreover, the imaging apparatus of the present invention may further comprise a sound collecting microphone which acquires a sound of the imaging region, and the control unit may control at least one of the sensitivity and the directivity of the sound collecting microphone according to switching of the magnification converting lens. In the above configuration, when the magnification converting lens is switched, the sound of an area to be imaged after the switching is appropriately acquired.

Further, in the imaging apparatus of the present invention, the control unit may suppress at least one of a movement detection function, an error detection function, and a warning output function by an image process during the switching of the magnification converting lens. The above configuration can appropriately prevent an erroneous detection or an erroneous operation during switching of the magnification converting lens.

Further, in the imaging apparatus of the present invention, the control unit may perform a process to restrict recording an image during the switching of the magnification converting lens. The above configuration can prevent an unwanted image from being recorded during switching of the magnification converting lens and can easily process the recorded image.

Further, in the imaging apparatus of the present invention, the control unit may send information indicating that the magnification converting lens is being switched according to switching of the magnification converting lens, together with the image to the outside. The above configuration can determine the image during switching of the magnification converting lens at a receiving side and can appropriately process the image at the receiving side. For example, when an error part search is performed by the image process, the image during switching can be excluded from the search target and thereby an erroneous detection can be prevented.

Further, in the imaging apparatus of the present invention, the control unit may record switching execution of the magnification converting lens. The above configuration can determine an image during switching of the magnification converting lens from the recorded image and can appropriately process the recorded image. For example, when an error part search is performed by the image process, the image during switching can be excluded from the search target and thereby an erroneous detection can be prevented.

Further, in the imaging apparatus of the present invention, the imaging unit may have a variable power lens which continuously changes the imaging magnification, and the control unit may control the variable power lens according to switching of the magnification converting lens and may maintain the imaging magnification when the magnification converting lens is switched. The above configuration can smoothly change the imaging magnification when the magnification converting lens is switched.

Further, in the imaging apparatus of the present invention, when the imaging magnification reaches a predetermined threshold insertion magnification, the control unit may insert the magnification converting lens; when the imaging magnification reaches a predetermined threshold extraction magnification, the control unit may extract the magnification converting lens; and the threshold insertion magnification and the threshold extraction magnification may be set differently. The above configuration can reduce switching frequency of the magnification converting lens. When an enlarged-type magnification converting lens is used, the threshold insertion magnification is set higher than the threshold extraction magnification. When a reduced-type magnification converting lens is used, the threshold extraction magnification is set higher than the threshold insertion magnification.

Further, in the imaging apparatus of the present invention, the imaging unit may have a variable power lens which continuously changes the imaging magnification, the control unit may receive a magnification instruction which instructs the imaging magnification, may switch the magnification converting lens according to the magnification instruction based on preset switching control information associating the magnification instruction with whether to insert or extract the magnification converting lens, and may control the variable power lens according to the inserted/extracted state of the magnification converting lens and the magnification instruction. The above configuration can achieve the magnification instruction in such a manner that when the imaging magnification is instructed, the magnification converting lens is automatically inserted or extracted, and the magnification of the variable power lens is controlled according to the inserted/extracted state of the magnification converting lens. Thus, the operator can easily operate without considering the presence or absence of the magnification converting lens.

Further, in the imaging apparatus of the present invention, the control unit may switch the magnification converting lens in conjunction with at least one of a movement detection function, an error detection function, and a warning output function by an image process. The above configuration allows the movement detection, the error detection, and the warning output to be performed at an appropriate magnification. For example, movement detection accuracy can be improved by increasing the magnification at movement detection. This can increase detection accuracy and can ensure warning output operation.

Another aspect of the present invention is an imaging method in which an image is imaged by an imaging unit having a magnification converting lens capable of switching between an inserted state and an extracted state with respect to an optical axis and a mask is composited to an object region of a privacy zone in the image generated by the imaging unit, and when the magnification converting lens is switched, a mask region in the image is changed according to a magnification shift caused by switching of the magnification converting lens, and the privacy zone is maintained in a masked state after the switching of the magnification converting lens. The above aspect can also provide the above described advantages of the present invention. Various additional configurations described above regarding the aspect of the imaging apparatus can also be applied to this aspect.

Hereinafter, the imaging apparatus according to an embodiment of the present invention will be described using the drawings.

FIG. 1 illustrates an imaging apparatus according to present embodiment. In FIG. 1, an imaging apparatus 1 includes an imaging unit 3, a signal processing circuit 5, an image recording unit 7, a rotation mechanism 9, a sound collecting microphone 11, and a control unit 13. The control unit 13 is connected an operation terminal 15 and an image recording apparatus 17 through a network or the like. The operation terminal 15 includes a monitor 19. In an example of the present embodiment, the imaging apparatus 1 is a security camera apparatus and visual images are monitored using the operation terminal 15.

As illustrated in the Figure, the imaging unit 3 includes a first group lens 21, a variable power lens 23, an aperture unit 25, a focus lens 27 and an extender 29 as a component of an optical system. The variable power lens 23 constitutes an optical zoom lens and is moved in an optical axis direction by a variable power lens drive unit 31 so as to continuously move the imaging magnification. The magnification of the variable power lens 23 is detected by a variable power lens magnification sensor 33 and inputted to the control unit 13. The extender 29 is an example of a magnification converting lens of the present invention and is inserted into and extracted from the optical axis so as to discontinuously change the imaging magnification. The extender 29 is driven by an extender drive unit 35.

The imaging unit 3 further comprises an imaging element 37. The above optical system forms an object image on an imaging surface of the imaging element 37. The imaging element 37 converts the image to an electrical signal. The imaging element 37 is an imaging sensor device such as a CCD or a CMOS.

The signal processing circuit 5 is a circuit which processes the image generated by the imaging unit 3 and corresponds to the signal processing unit of the present invention. The signal processing circuit 5 has a function of compositing a mask to a privacy zone in the image. In addition, the signal processing circuit 5 may include a movement detection function and may further include an error detection function. The error detection may be performed based on movement detection results. Moreover, the control unit 13 or the like may further include a warning output function at the time of error detection.

The image recording unit 7 is configured of a memory and records the image generated by the imaging unit 3. The recorded image is read under control of the control unit 13.

The rotation mechanism 9 is configured to rotate the imaging unit 3 and is configured of for example, a turntable. The rotation mechanism 9 may include a motor and a mechanism for transmitting the rotation. The rotation mechanism 9 may have a pan drive mechanisms and a tilt drive mechanisms. In this case, the rotation mechanism 9 may have a pan motor and a tilt motor and may rotate the imaging unit 3 in a pan direction and in a tilt direction. The rotation of the rotation mechanism 9 is controlled by the control unit 13. The rotation mechanism 9 supplies rotation angles (pan angle and tilt angle) to the control unit 13 as imaging direction information.

The sound collecting microphone 11 collects sounds around the location where the imaging apparatus 1 is set. The sound collecting microphone 11 is controlled by the control unit 13 and thereby sensitivity and directivity are adjusted.

The control unit 13 is configured to control the entire imaging apparatus 1. When an operation instruction is received from the operation terminal 15, the control unit 13 controls various components of the imaging apparatus 1 according to the operation instruction. As the operation instruction, imaging magnification information and imaging direction information are inputted. In addition, the control unit 13 outputs the image generated by the imaging apparatus 1 to the operation terminal 15 and the image recording apparatus 17. The operation terminal 15 displays the image on the monitor 19 and the image recording apparatus 17 records the image therein.

Figure 2:
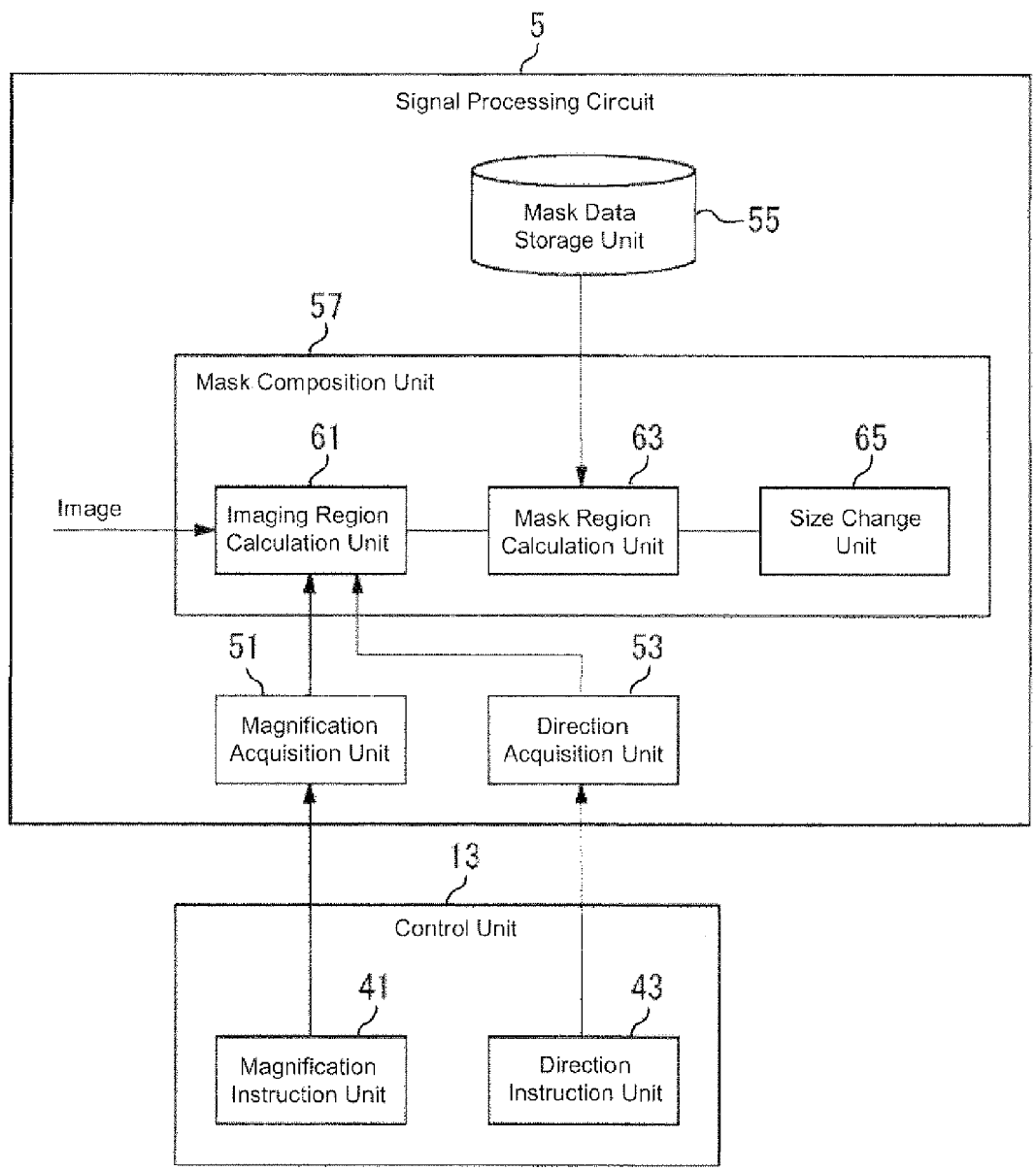
FIG. 2 is a drawing illustrating a configuration related to mask composition in a signal processing circuit and a control unit.

FIG. 2 illustrates a configuration related to mask composition in the signal processing circuit 5 and the control unit 13. As illustrated in the Figure, the control unit 13 has a magnification instruction unit 41 and a direction instruction unit 43. These units instruct the signal processing circuit 5 to receive an imaging magnification and an imaging direction. The imaging magnification and the imaging direction are supplied to the signal processing circuit 5 as mask instruction information to be used for mask composition.

The magnification instruction unit 41 acquires the magnification of the variable power lens 23 supplied from the variable power lens magnification sensor 33 to the imaging unit 3. Note that the imaging unit 3 controls the extender drive unit 35 and has information on the switching state of the extender 29. This information is supplied to the magnification instruction unit 41. The magnification instruction unit 41 calculates the imaging magnification based on the magnification of the variable power lens 23 and the switching state of the extender 29. When the extender 29 is not inserted, the magnification instruction unit 41 calculates the imaging magnification from only the magnification of the variable power lens 23. When the extender 29 is inserted, the magnification instruction unit 41 calculates the imaging magnification from the magnification of the variable power lens 23 and the magnification of the extender 29. Then, the imaging magnification instruction unit 41 supplies the imaging magnification to the signal processing circuit 5.

In addition, the direction instruction nit 43 calculates the imaging direction based on information on the rotation angle of the imaging unit 3 supplied from the rotation mechanism 9 to the control unit 13. The imaging direction is the direction of the optical axis of the imaging unit 3. The information on the imaging direction may be a central coordinate of the imaging region. The information on the imaging direction is also supplied to the signal processing circuit 5.

As illustrated in FIG. 2, the signal processing circuit 5 has a magnification acquisition unit 51, a direction acquisition unit 53, a mask data storage unit 55, and a mask composition unit 57. The mask composition unit 57 has an imaging region calculation unit 61, a mask region calculation unit 63, and a coordinate conversion unit 65.

The magnification acquisition unit 51 and the direction acquisition unit 53 acquire an imaging magnification and an imaging direction from the magnification instruction unit 41 and the direction instruction unit 43. The mask data storage unit 55 stores mask data representing the range of a predetermined privacy zone in a global space. The mask data storage unit 55 may be, for example, a non-volatile memory.

The imaging region calculation unit 61 of the mask composition unit 57 calculates the angle of view from the imaging magnification and calculates the imaging region from the angle of view and the imaging direction. The mask region calculation unit 63 calculates the mask region in the imaging region based on the mask data stored in the mask data storage unit 55. The mask region calculation unit 63 calculates a relative region of the privacy zone to the imaging region as the mask region in the imaging region. Then, the coordinate conversion unit 65 performs coordinate conversion of the mask region so as to match the image size and a mask is composited to the image in the mask region after the coordinate conversion.

Figure 3:
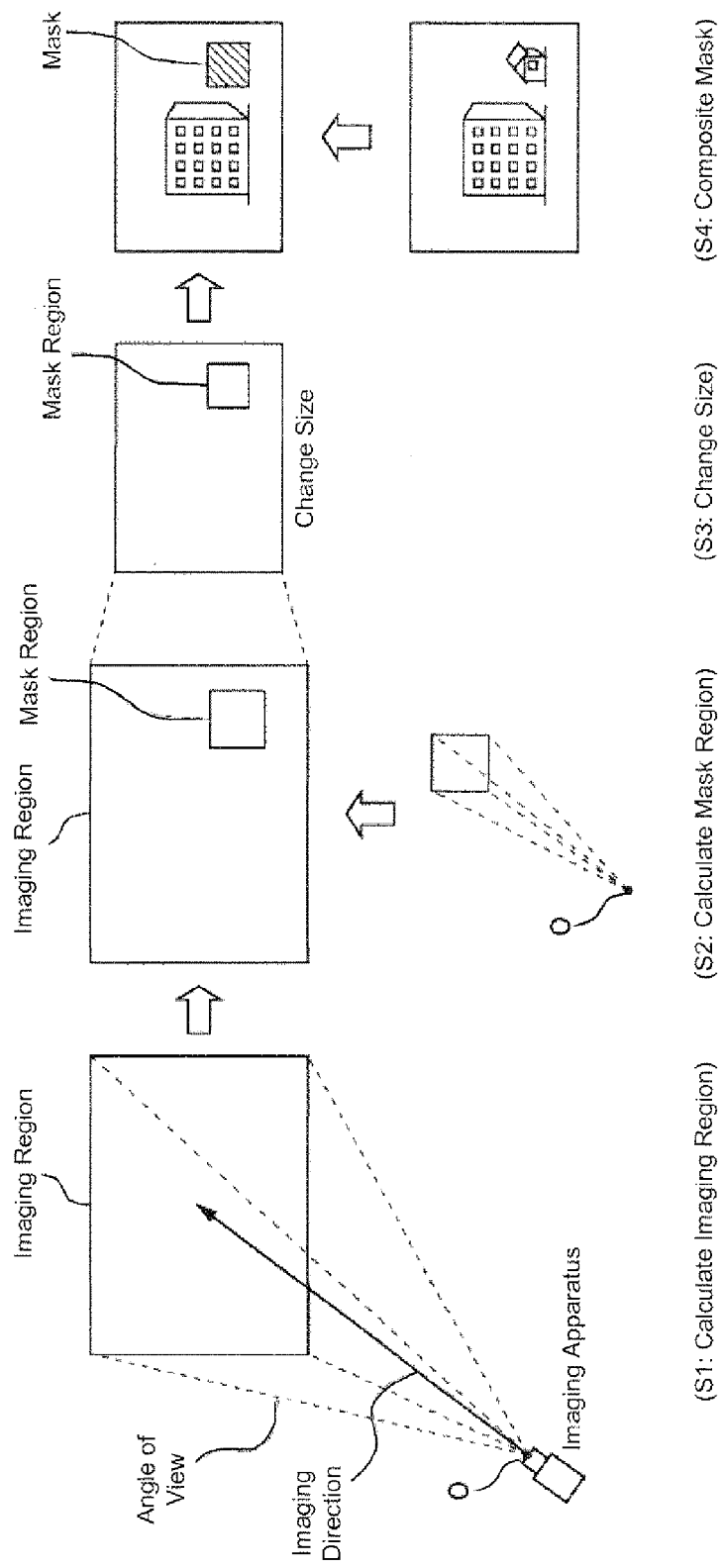
FIG. 3 is a drawing illustrating a mask composition process in the signal processing circuit.

FIG. 3 illustrates the principle of the mask composition process. As illustrated in the figure, first, the imaging region is calculated from the imaging magnification and the imaging direction (S1). Then, the mask region in the imaging region is calculated based on the mask data (S2). The mask data indicates a region of a privacy zone in a global space. The region of a privacy zone in a global space is converted to a relative region to the imaging region and is calculated as the mask region. Accordingly, the mask region corresponds to the privacy zone in the global space indicated by the mask data. Further, the mask region in the imaging region is converted to an image coordinate (S3). Here, a conversion factor for converting the imaging region to the image coordinate may be calculated and the mask region may be converted using the conversion factor. Then, the mask is composited to the image in the mask region after coordinate conversion (S4).

Hereinbefore, the configuration of the imaging apparatus 1 according to an embodiment of the present invention has been described. Hereinafter, the operation of the imaging apparatus 1 will be described.

First, a schematic operation of the imaging apparatus 1 will be described. When an operator operates the operation terminal 15 and inputs an operation instruction, the operation instruction is sent from the operation terminal 15 to the imaging apparatus 1 and received by the control unit 13. Note that the operation instruction includes an imaging magnification and an imaging direction.

In order to match the imaging magnification with the instructed value, the control unit 13 controls the variable power lens drive unit 31 and the extender drive unit 35 to change the imaging magnification. In addition, the control unit 13 controls the rotation mechanism 9 to orient the imaging unit 3 in the instructed imaging direction.

When the imaging magnification is low, the control unit 13 controls the extender drive unit 35 to extract the extender 29 from the optical axis. Then, the control unit 13 controls the variable power lens drive unit 31 to move the variable power lens 23 along the optical axis and adjust the imaging magnification. When the imaging magnification is high, the control unit 13 controls the extender drive unit 35 to insert the extender 29 into the optical axis. Accordingly, the imaging magnification is discontinuously shifted and imaging is enabled at high magnification. Even in a state in which the extender 29 is inserted, the magnification may be adjusted by controlling the position of the variable power lens 23.

Thus, the imaging apparatus 1 images an image under control of the control unit 13 and the image is supplied to the signal processing circuit 5. Then, the signal processing circuit 5 performs mask composition as described above. The image is read from or written to the image recording unit 7 under instruction of the control unit 13. The control unit 13 outputs the image after mask composition to the operation terminal 15 and the image recording apparatus 17.

Hereinbefore, the entire operation of the imaging apparatus 1 has been described. Hereinafter, the mask composition operation when the extender 29 is switched will be described. Here, the description focuses on the operation of inserting the extender 29 to increase the magnification.

Before the extender 29 is switched, the extender 29 is extracted from the optical axis. At this time, the magnification instruction unit 41 of the control unit 13 calculates the imaging magnification from the magnification of the variable power lens 23 inputted from the variable power lens magnification sensor 33 and supplies the signal processing circuit 5 with the imaging magnification. In addition, the direction instruction unit 43 supplies the signal processing circuit 5 with the imaging direction information obtained from the rotation mechanism 9.

In the signal processing circuit 5, the magnification acquisition unit 51 acquires the imaging magnification and the direction acquisition unit 53 acquires the imaging direction. As described in FIG. 3, the mask composition unit 57 performs mask composition based on the imaging magnification, the imaging direction, and the mask data of the mask data storage unit 55.

When only the variable power lens 23 is not sufficient for imaging magnification, the control unit 13 inserts the extender 29 into the optical axis. When the extender 29 is switched, the magnification instruction unit 41 of the control unit 13 calculates the imaging magnification after the extender 29 is switched, from the magnification of the variable power lens 23 and the magnification of the extender 29. The imaging magnification after the switching is supplied to the signal processing circuit 5 and is acquired by the magnification acquisition unit 51. The direction instruction unit 43 supplies the direction acquisition unit 53 with the imaging direction information after the switching obtained from the rotation mechanism 9.

Thus, the signal processing circuit 5 acquires the imaging magnification and the imaging direction after the switching. The imaging magnification after the switching is a magnification shifted due to the insertion of the extender 29. The imaging direction after the switching is a current imaging direction changed due to the rotation of the imaging unit 3. The signal processing circuit 5 performs mask composition using the imaging magnification and the imaging direction after the switching. The imaging region calculation unit 61 of the mask composition unit 57 calculates the angle of view from the shifted imaging magnification and calculates the imaging region from the angle of view and the imaging direction. The calculated results are used by the mask region calculation unit 63 to calculate the mask region. Further, the coordinate conversion unit 65 performs coordinate conversion and the mask is composited to the mask region after the coordinate conversion.

Thus, in the present embodiment, when the imaging magnification is shifted due to the switching of the extender 29, mask composition can be performed based on the imaging magnification after shifting. In addition, an imaging direction change due to the rotation of the imaging unit 3 is appropriately reflected on the mask composition.

Figure 4A:
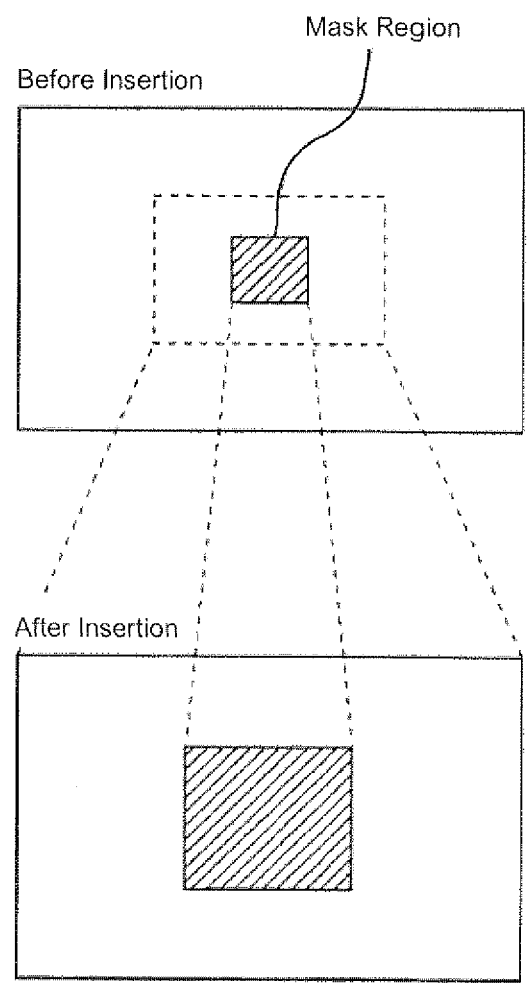
FIG. 4A is a drawing illustrating an example of the mask composition when a mask region is located in the center of an image and an imaging unit remains stationary.
Figure 4B:
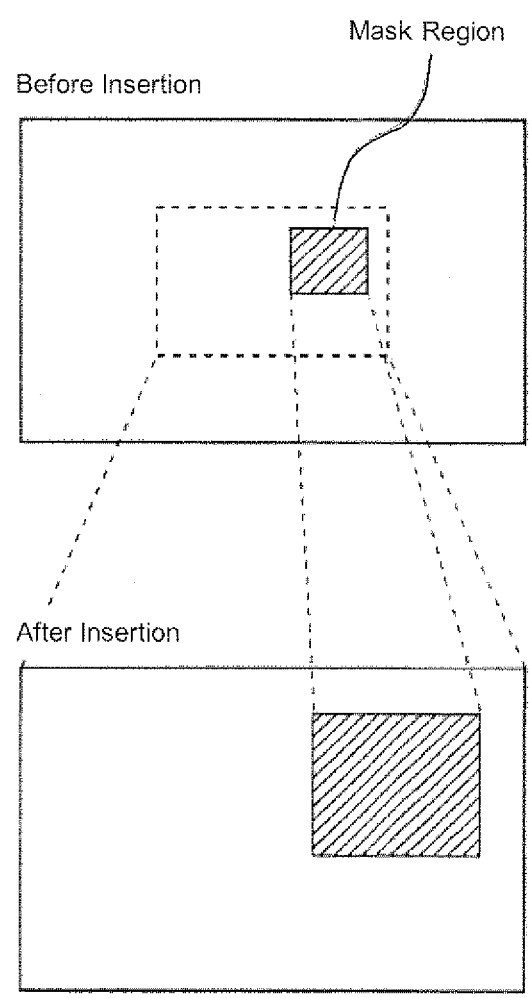
FIG. 4B is a drawing illustrating an example of the mask composition when the mask region is not located in the center of the image and the imaging unit remains stationary.
Figure 4C:
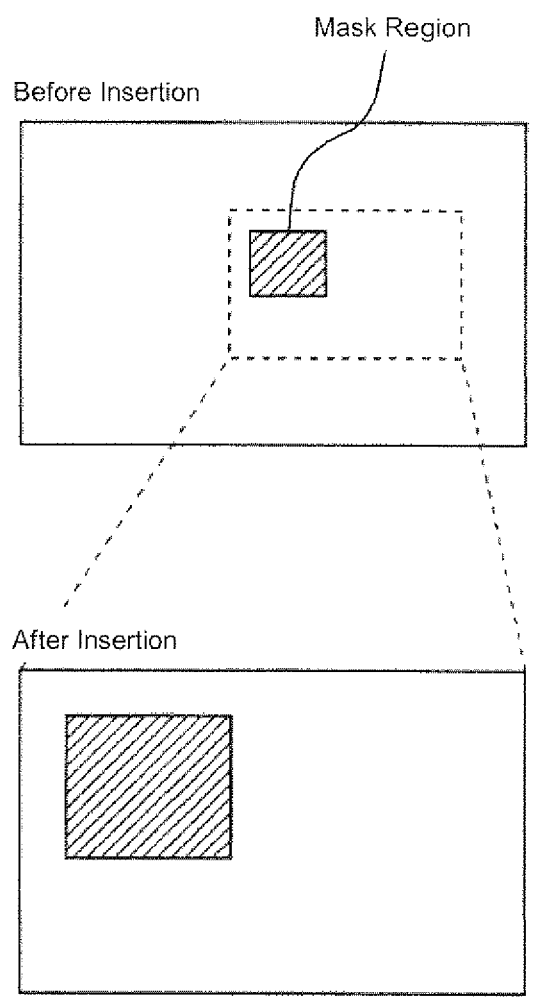
FIG. 4C is a drawing illustrating an example of the mask composition when the mask region is not located in the center of the image and the imaging unit is rotating.

FIGS. 4A, 4B, and 4C illustrate an example of the mask composition according to the present embodiment.

In an example of FIG. 4A, a mask region is located in the center of the image before the extender 29 is inserted. The imaging unit 3 is assumed to be stationary. In the image before switching, the region of the image after switching is indicated by a dotted line. In the present embodiment, when the extender is switched and the imaging magnification is shifted, calculation of the angle of view and mask composition are performed according to the imaging magnification after the switching. Accordingly, as illustrated in the figure, the mask region size is changed according to the magnification shift and the change in angle of view caused thereby. Thus, the object region to be masked can be maintained before and after the switching, thereby preventing the mask from being shifted from the privacy zone to be hidden.

In an example of FIG. 4B, the mask region is not located in the center of the image before the extender 29 is inserted. The imaging unit 3 is assumed to be stationary. In this case, when the extender is switched and the imaging magnification is shifted, calculation of the angle of view and mask composition are also performed according to the imaging magnification after the switching. In this case, the size and the position of the mask region are changed according to the magnification shift and the change in angle of view caused thereby. In the example of the figure, the angle of view is small and thus the mask region is located in an upper right corner of the image. However, the object region to be masked can be maintained before and after the switching, thereby preventing the mask from being shifted from the privacy zone to be hidden.

In an example of FIG. 4C, the mask region is not located in the center of the image before the extender 29 is inserted. Further, it is assumed that the imaging unit 3 is rotating and the extender 29 is inserted during the rotation. In this case, when the extender is switched and the imaging magnification is shifted, calculation of the angle of view and mask composition are also performed according to the imaging magnification after the shifting. Note that the mask composition is performed based on the imaging direction changed due to the rotation. As a result, as illustrated in the figure, the size and the position of the mask region are changed. In the example of the figure, the mask region is shifted upward from the center of the image before the switching. The angle of view is small and thus the mask region moves in an upper end direction of the image. Note also that the imaging unit 3 is rotated in a right direction and thus the mask region moves left in the image. As a result, the mask region is located close to the upper left corner of the image. However, the object region to be masked can be maintained before and after the switching, thereby preventing the mask from being shifted from the privacy zone to be hidden.

Hereinbefore, the mask composition when the extender 29 is switched has been described. Hereinafter, as more detailed description of the operation, the operation during switching will be described.

Figure 5:
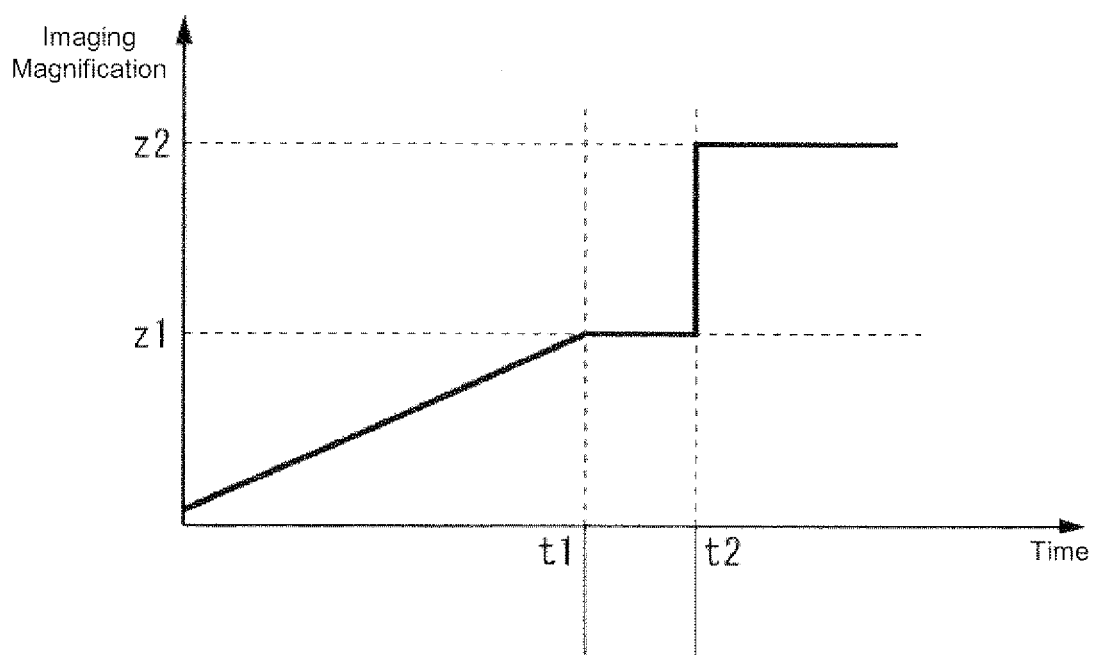
FIG. 5 is a drawing describing an operation of the imaging apparatus during switching.

FIG. 5 illustrates an operation of the imaging apparatus 1 during switching. In FIG. 5, the horizontal axis indicates time and the vertical axis indicates imaging magnification. $z1$ denotes a maximum magnification of the variable power lens 23. $z2$ denotes a magnification multiplying the magnification $z1$ with the magnification of the extender 29. $t1$ denotes a point of time when insertion of the extender 29 starts. $t2$ denotes a point of time when the insertion of the extender 29 completes. Therefore, the period $t1$ to $t2$ is a period during the switching of the extender 29.

In FIG. 5, before time $t1$, the imaging magnification increases as time elapses. The images obtained during this period are sequentially held in the image recording unit 7. When the imaging magnification reaches $z1$ at time $t1$, the insertion of the extender 29 starts. During the insertion of the extender 29 ($t1$ to $t2$), the control unit 13 suppresses outputting of the image generated by the imaging unit 3 and outputs an interpolated image instead. The interpolated image is an image immediately before the switching ($t1$) held in the image recording unit 7 (FIG. 1). The output image is displayed, for example, on a monitor of the imaging apparatus 1 and also displayed on the monitor 19 connected to the operation terminal 15. This can avoid an image taken by the extender 29 during insertion from being outputted and thus can output a natural image not providing the user with a feeling of strangeness.

The control unit 13 continuously supplies the signal processing circuit 5 with the imaging magnifications during the switching of the extender 29 ($t1$ to $t2$) and immediately before the switching ($t1$) as mask instruction information. Thus, the mask composition is performed using the imaging magnification corresponding to the interpolated image.

Further, the control unit 13 supplies the signal processing circuit 5 with imaging directions during the switching of the extender 29 ($t1$ to $t2$) and immediately before the switching ($t1$). Thus, the mask composition is performed using the imaging direction immediately before the switching ($t1$).

Thus, the present embodiment can restrict mask movement corresponding to rotation by the rotation mechanism 9 by fixing the imaging direction used for mask composition, thereby preventing mask shift during switching.

The above mask shift prevention effect will be described in more detail. The imaging unit 3 is rotated during switching of the extender 29. If there is no process of fixing the imaging direction to a value immediately before the switching, the control unit 13 continues to change the imaging direction for mask instruction even during switching of the extender 29. However, the outputted interpolated image remains stationary. Therefore, the imaging direction of the interpolated image is different from the imaging direction of the mask process, resulting in mask shift. In contrast to this, in the present embodiment, during switching of the extender 29, the imaging direction when the interpolated image is acquired is continuously used. This can prevent the mask from being shifted from the privacy zone.

Thus, the present embodiment can provide natural images by outputting the recorded interpolated images and can prevent shifting of the mask during switching.

Figure 6B:
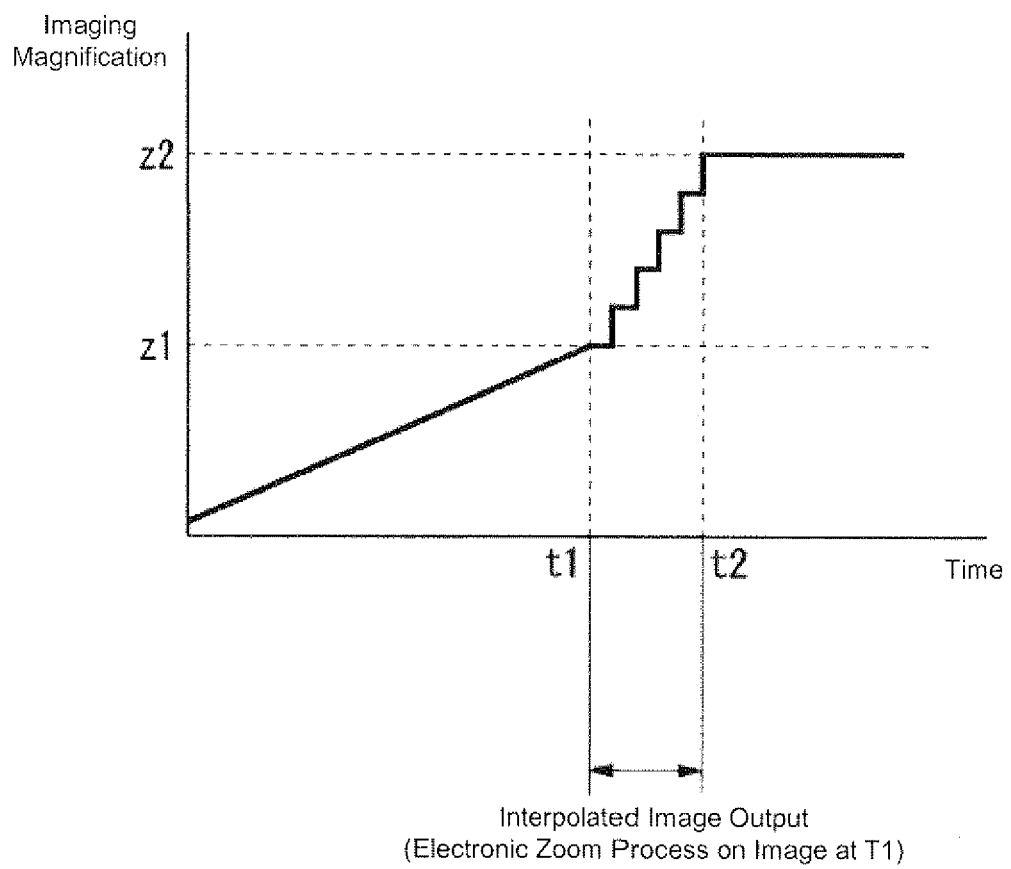
FIG. 6B is yet another drawing describing the operation of the imaging apparatus during switching.

FIGS. 6A and 6B are a modification of the operation during switching of the extender 29. In FIGS. 6A and 6B, like FIG. 5, during switching of the extender 29 ($t1$ to $t2$), an image stored in the image recording unit 7 is outputted as the interpolated image. Note that in FIG. 6A, the magnification of the interpolated image is increased to $z2$ by electronic zoom. In FIG. 6B, the magnification is increased stepwise during $t1$ to $t2$ by electronic zoom process.

In FIGS. 6A and 6B, the imaging direction instruction is the same as that in FIG. 5. More specifically, the control unit 13 supplies the signal processing circuit 5 with the imaging directions during switching of the extender 29 ($t1$ to $t2$) and at time $t1$.

In contrast to this, the magnification instruction in FIGS. 6A and 6B is different from that in FIG. 5. In FIG. 6A, the control unit 13 supplies the signal processing circuit 5 with the magnification $z2$ during switching of the extender 29 ($t1$ to $t2$) and at time $t2$. In FIG. 6B, the control unit 13 supplies the signal processing circuit 5 with the magnification at each point of time increased stepwise by electronic zoom. In short, regarding the magnification, the signal processing circuit 5 is supplied with the magnification at each point of time during $t1$ to $t2$.

These processes can also avoid an image taken by the extender 29 during insertion from being outputted and thus can output a natural image not providing the user with a feeling of strangeness. In addition, during switching of the extender 29, the imaging direction at the switching starting time $t1$ (when the interpolated image is acquired) is continuously used. This can prevent the mask from being shifted from the privacy zone.

The processes in FIGS. 5, 6A, and 6B are disclosed in Japanese Patent Laid-Open No. 2005-202263 described above. The above document discloses a plurality of processes about the image output when the extender is switched. Each process disclosed in the document can be appropriately applied to the present embodiment.

Hereinafter, the rotation speed control according to the present embodiment will be described. The control unit 13 is configured to control the rotation speed of the imaging unit 3 by the rotation mechanism 9. In particular, the control unit 13 is configured such that when the extender 29 is switched during rotation of the imaging unit 3, the rotation speed is changed according to the magnification shift by the switching to maintain the object movement speed in the image before and after the switching of the extender 29. When the angle of view is changed due to the magnification shift, the control unit 13 may change the rotation speed of the imaging unit 3 in proportion to the angle of view, namely, in inverse proportion to magnification. Such control allows the user to feel equally easy to perform a magnification changing operation regardless of the presence or absence of the magnification converting lens.

In more detail, the object movement speed in the image is in inverse proportion to the angle of view and the angle of view is in inverse proportion to the magnification. Therefore, the object movement speed in the image is in proportion to the magnification. In order to maintain a constant object movement speed in the image when the magnification is shifted due to the switching of the variable power lens 23, the actual movement speed needs to be reduced in inverse proportion to the magnification. Thus, the reduction in actual movement speed offsets the speed increase due to the magnification change. In light of this, the control unit 13 sets "the rotation speed after insertion of the extender 29" to "a value obtained by dividing the rotation speed before insertion of the extender 29 by the magnification of the extender 29" ("after-insertion speed="before-insertion speed/"extender magnification"). The above rotation speed control allows the object movement speed in the image to be maintained before and after the switching.

Figure 7:
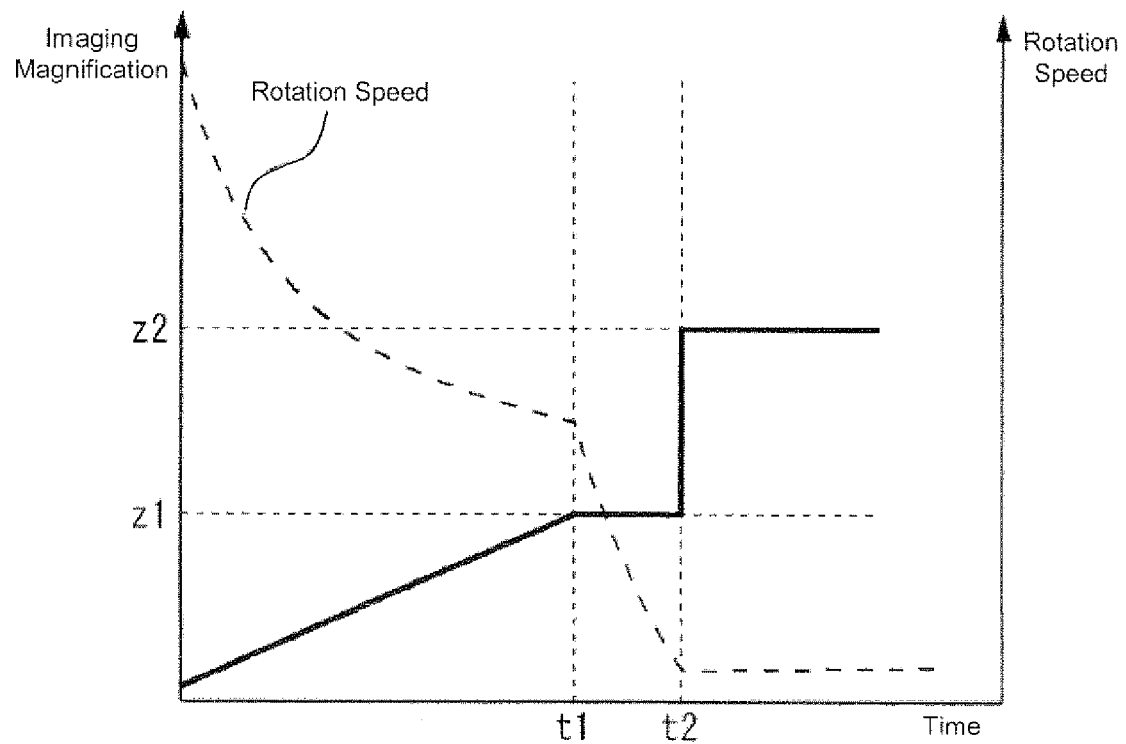
FIG. 7 is a drawing illustrating a rotation speed control of a rotation mechanism when an extender is switched.

FIG. 7 illustrates the above speed control. In FIG. 7, the rotation speed (dotted line) is superposed on FIG. 5. At time t1, the imaging magnification reaches z1 and during period t1 to t2, the extender 29 is inserted. At this time, the rotation speed is reduced. A described above, the rotation speed at time t2 is assumed to be a value obtained by dividing the rotation speed at time t1 by the magnification of the extender 29.

As illustrated in FIG. 7, the present embodiment continuously changes the rotation speed during the period t1 to t2. In the example of FIG. 7, the speed is changed at a constant rate. Such a control can prevent a sharp speed change, that is, can provide a smooth speed change.

Hereinbefore, a preferred appropriate rotation speed control when the extender 29 is switched has been described. Further, the present embodiment appropriately controls the magnification change speed of the zoom by the variable power lens 23. The control unit 13 is configured such that when the extender 29 is switched during magnification change of the variable power lens 23, the magnification change speed of the variable power lens 23 is changed according to the magnification shift to maintain the object size change speed in the image before and after the switching of the extender 29. When the angle of view is changed due to the magnification shift, the control unit 13 may change the magnification change speed in proportion to the angle of view. The above control allows the user to feel equally easy to perform a magnification change operation regardless of the presence or absence of the magnification converting lens.

In more detail, the object size change speed in the image is in inverse proportion to the angle of view and the angle of view is in inverse proportion to the magnification. Therefore, the object size change speed in the image is in direct proportion to the magnification. In order to maintain a constant object size change speed in the image when the magnification is shifted due to the switching of the variable power lens 23, the magnification change speed of the variable power lens needs to be reduced. Thus, the reduction in magnification change speed of the variable power lens offsets the increase in object size change speed due to the magnification change. In light of this, the control unit 13 sets "the magnification change speed after insertion of the extender 29" to "a value obtained by dividing the magnification change speed before insertion of the extender 29 by the magnification of the extender 29" ("after-insertion speed="before-insertion speed/"extender magnification"). The control allows the object size change speed in the image to be maintained before and after the switching.

Like the rotation speed change illustrated in FIG. 7, the magnification change speed is also continuously changed during the period t1 to t2. The speed may be changed at a constant rate. Such a control can prevent a sharp speed change, thus enabling a smooth speed change.

Hereinbefore, various operations of the imaging apparatus 1 according to the present embodiment have been described in detail. The above description focuses mainly on the operation when the extender 29 is inserted. The operation when the extender 29 is extracted is opposite to the operation above, and in principle, is the same as the above described operation when the extender 29 is inserted. Thus, the detailed description is omitted. Schematically, when the extender 29 is extracted, the magnification is shifted to a small value. The shifted magnification is used to perform mask composition. During the period when the extender 29 is extracted, an image immediately before the extraction is outputted as the interpolated image and the mask composition is performed using the imaging direction information immediately before the extraction. Further, at the time of extraction, the rotation speed is increased. The rotation speed after extraction is obtained by multiplying the rotation speed before extraction by the magnification of the extender 29. Further, the rotation speed is continuously changed during the period from the start of the extraction to the completion of the extraction.

In addition, the magnification change speed of the variable power lens 23 is also increased. The magnification change speed after extraction is obtained by multiplying the magnification change speed before extraction by the magnification of the extender 29. Further, the magnification change speed is continuously changed during the period from the start of the extraction to the completion of the extraction.

Hereinafter, various modifications and application examples applicable to the imaging apparatus 1 according to the present embodiment will be described.

(1) In the present embodiment, the magnification converting lens is the extender 29 and the extender 29 is an enlarged-type teleconverter. However, the magnification converting lens may be a reduced-type wide-converter.

(2) The rotation mechanism 9 may not be provided. The imaging direction is fixed. The above case can also prevent the mask shift due to the magnification shift and thus can appropriately provide advantages of the present invention.

(3) The control unit 13 may change the mask region size a predetermined transient period earlier or later than the switching timing (switching time) of the magnification converting lens 29 so that the size of the mask region is larger than that of the object region of the privacy zone. In the examples of FIGS. 4A to 4C, the magnification is increased by the insertion of the magnification converting lens 29. At this time, the mask region size is increased a predetermined transient period (transient period) earlier than the switching start time. In other word, the lens switching starts after the mask region is enlarged and a predetermined time elapses. Specifically, the control unit 13 increases the magnification instruction to the signal processing circuit 5 and starts switching the magnification converting lens 29 after a predetermined time elapses. The predetermined time is, for example, a time corresponding to a predetermined number of frames and may be one frame of time. On the contrary to the above, in order to reduce the magnification by extracting the magnification converting lens 29, the mask region size is reduced after a predetermined time (for example, a time corresponding to a predetermined number of frames, and may be one frame of time) elapses from the switching completion. In this case, the control unit 13 reduces the instruction magnification a predetermined time (transient period) later than the switching completion. The above configuration allows the size of the mask region to be surely larger than the size of the object region of the privacy zone and thus the privacy zone can be surely covered with the mask.

When the magnification converting lens is a reduced-type wide-converter, a control contrary to the above may be performed. More specifically, when the magnification converting lens is inserted, the mask region is reduced at a predetermined time after the insertion completes. When the magnification converting lens is extracted, the mask region is enlarged at a predetermined time before the insertion starts. Thus, the size of the mask region is surely larger than the size of the object region of the privacy zone.

(4) The control unit 13 may control at least one of the sensitivity and the directivity of the sound collecting microphone 11 according to switching of the extender 29. The sensitivity may be in direct proportion to the magnification of the extender 29 and the directivity may be in reverse proportion to the magnification of the extender 29. Specifically, when the extender 29 is inserted, the sensitivity is increased and the directivity is reduced. Thus, the relationship between the imaging region and the sound collecting region can be maintained before and after the switching of the extender 29.

(5) During switching of the extender 29, the control unit 13 may suppress at least one of the movement detection function, the error detection function, and the warning output function by the image process. The movement detection function and the error detection function are performed by an image processing function of the signal processing circuit 5. The error detection may be performed based on the movement detection results. The warning may be outputted from the control unit 13 to the operation terminal 15 and like at the time of error detection. An erroneous detection or an erroneous operation can be appropriately prevented by suppressing these functions during switching of the extender 29.

(6) The control unit 13 may perform a process for restricting the recording of an image during switching of the extender 29. Thus, an unwanted image is not recorded during switching of the magnification converting lens and the recorded image can be easily processed.

As the process for restricting the recording of an image, a plurality of processes can be considered as follows. The control unit 13 may prohibit the image from being stored in a recording medium provided in the imaging apparatus 1 during switching of the extender 29. For example, it is assumed that at the time of the movement detection or the error detection, an image is recorded or the image is recorded by a scheduling function. The control unit 13 prohibits the above recording during switching of the extender 29.

In addition, during switching of the extender 29, the control unit 13 may output a signal indicating a period of switching (switching period) to the image recording apparatus 17. During the period when the signal indicating a period of switching is received, the image recording apparatus 17 may prohibit the image recording.

Moreover, the control unit 13 may suppress sending the image to the operation terminal 15 and the image recording apparatus 17 during switching of the extender 29.

Moreover, during switching of the extender 29, instead of the imaging image, the control unit 13 may output the image before switching read from the image recording unit 7 to the operation terminal 15 and the image recording apparatus 17.

Moreover, during switching of the extender 29, instead of the imaging image, the control unit 13 may output the image indicating a period of switching to the operation terminal 15 and the image recording apparatus 17. The image indicating a period of switching is, for example, an image containing a character indicating a period of switching. Information about the image indicating a period of switching may be preliminarily stored.

(7) The control unit 13 may send information indicating that the extender 29 is being switched according to switching of the extender 29, together with the image to the outside, namely, to the operation terminal 15 and the image recording apparatus 17. Information about the image indicating a period of switching may be added to, for example, a header. The above configuration can determine the image during switching of the extender 29 at a receiving side and can appropriately process the image at the receiving side. For example, when an error part search is performed by the image process, the image during switching can be excluded from the search target and thereby an erroneous detection can be prevented.

(8) The control unit 13 may record switching execution of the extender 29. The switching execution is recorded in a recording medium or the like of the imaging apparatus 1. The above configuration can determine an image during switching of the extender 29 from the recorded image and can appropriately process the recorded image. For example, when an error part search is performed by the image process, the image during switching can be excluded from the search target and thereby an erroneous detection can be prevented.

(9) The control unit 13 may control the variable power lens 23 according to switching of the extender 29 and may maintain the imaging magnification when the magnification converting lens 29 is switched. The above configuration can smoothly change the imaging magnification when the magnification converting lens is switched.

Figure 8:
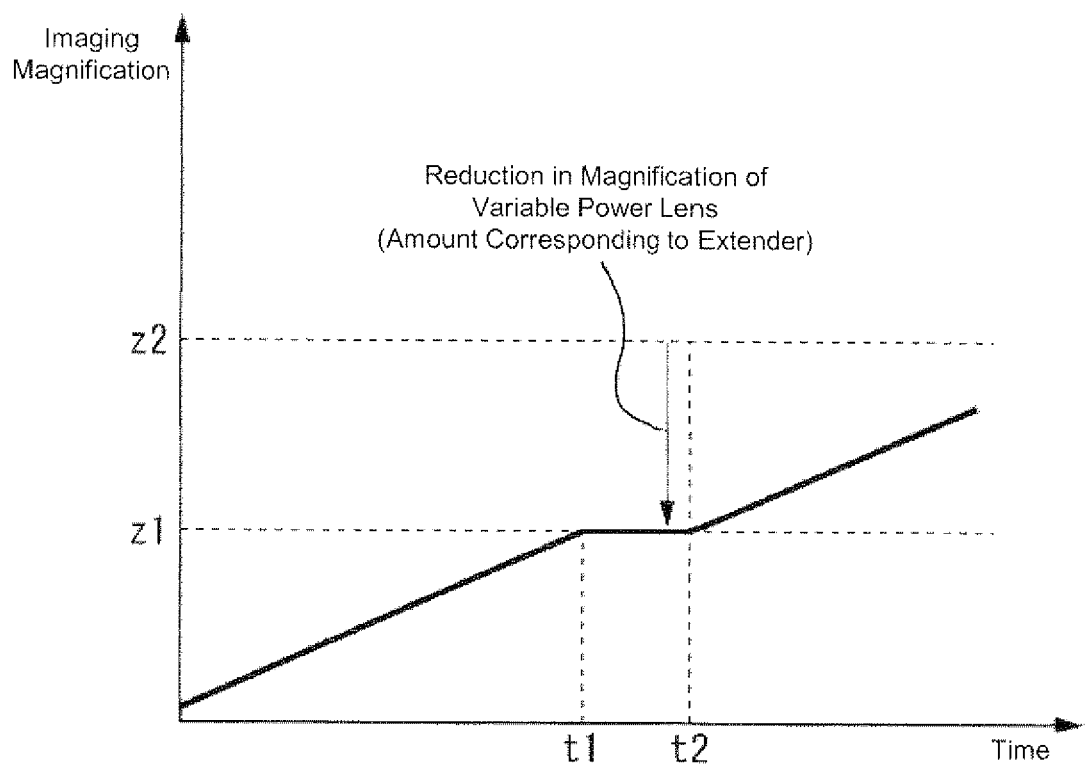
FIG. 8 is a drawing describing a preferred control of a variable power lens according to switching of the extender.

By referring to FIG. 8, the above magnification control will be described. In FIG. 8, like FIG. 5, the horizontal axis indicates time and the vertical axis indicates imaging magnification. During the period from time t1 to time t2, the extender 29 is inserted. The magnification of the variable power lens 23 is reduced at time t2 in comparison with time t1. Accordingly, the magnification increase by the extender 29 offsets the magnification reduction by the variable power lens 23. Thus, the magnification remains the same before and after the insertion of the extender 29. After the time t2, the magnification is increased by controlling the variable power lens 23.

For example, it is assumed that the magnification of the extender 29 is 10 times. When the extender 29 inserted, the control unit 13 controls the magnification of the variable power lens 23 so as to generate 9 times the magnification reduction. When the extender 29 is extracted, the control unit 13 controls the magnification of the variable power lens 23 so as to generate 9 times the magnification increase. Thus, the imaging magnification is the same immediately before and after the switching of the magnification converting lens, thereby smoothly changing the imaging magnification.

(10) When the imaging magnification reaches a predetermined threshold insertion magnification, the control unit 13 may insert the extender 29. When the imaging magnification reaches a predetermined threshold extraction magnification, the control unit 13 may extract the extender 29. The threshold insertion magnification and the threshold extraction magnification may be set differently. The above configuration can reduce switching frequency of the magnification converting lens. In the present embodiment, an enlarged-type magnification converting lens is used. In this case, the threshold insertion magnification is set higher than the threshold extraction magnification. On the contrary, when a reduced-type magnification converting lens is used, the threshold extraction magnification is set higher than the threshold insertion magnification.

Figure 9:
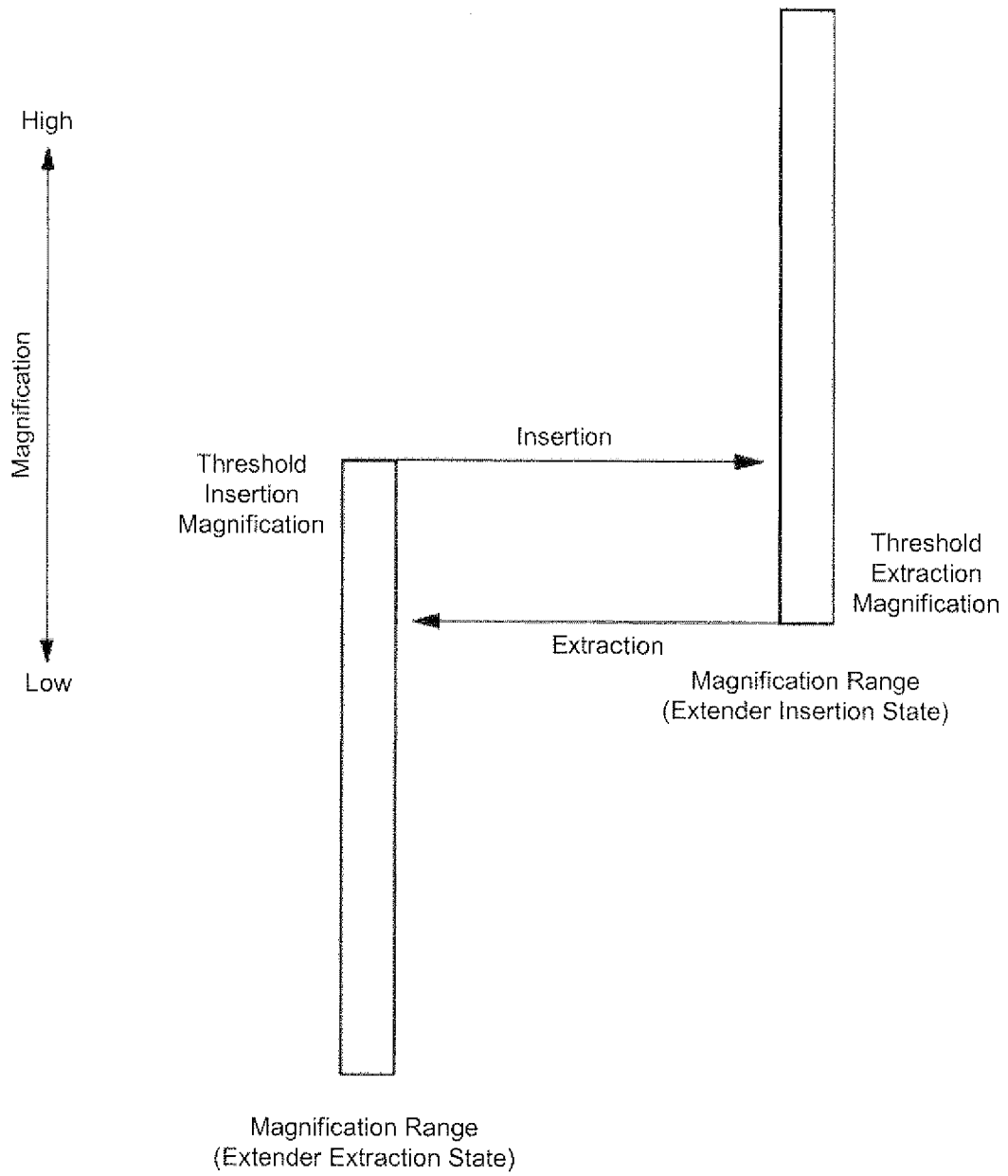
FIG. 9 is a drawing illustrating an appropriate setting of a threshold insertion magnification and a threshold extraction magnification.

FIG. 9 illustrates an example of the above threshold setting. More specifically, FIG. 9 illustrates the magnification range of an inserted state of the extender 29 and the magnification range of an extracted state thereof. The two magnification ranges are shifted to each other depending on whether the extender 29 is inserted or not. The two magnification ranges are partially overlapped. As illustrated in the figure, the threshold insertion magnification is set higher than the threshold extraction magnification.

According to FIG. 9, the extender 29 is switched as follows. First, it is assumed that the magnification is low and the extender 29 is not inserted yet. When the magnification is increased and reaches the threshold insertion magnification, the extender 29 is inserted. Even if the magnification is reduced a little immediately afterward but the magnification does not reach the threshold extraction magnification, the extender 29 is not extracted. Then, the magnification is adjusted using the variable power lens 23.

Meanwhile, it is assumed that the magnification is high and the extender 29 remains inserted. When the magnification is reduced and reaches the threshold extraction magnification, the extender 29 is extracted. Even if the magnification is increased a little immediately afterward but the magnification does not reach the threshold insertion magnification, the extender 29 is not inserted. Then, the magnification is adjusted using the variable power lens 23.

Thus, the present embodiment can provide hysteresis by appropriately setting the magnification as the switching criterion for the extender 29 and can appropriately reduce the switching frequency of the magnification converting lens.

(11) The control unit 13 may receive a magnification instruction which instructs the imaging magnification, may switch the extender 29 according to the magnification instruction based on preset switching control information associating the magnification instruction with whether to insert or extract the extender 29, and may further control the magnification of the variable power lens 23 according to the inserted/extracted state of the extender 29 and the magnification instruction.

The above switching control information may be stored in a storage apparatus of the imaging apparatus 1. The switching control information is, for example, a priority table. The priority table is a table in which whether or not to prioritize the use of the extender 29 (whether to insert the extender 29 or to adjust the magnification by only the variable power lens 23) is preliminarily set according to the imaging magnification. The control unit 13 refers to the priority table to determine whether or not to insert the extender 29 according to the magnification instruction. Based on the determined result, the control unit 13 switches the extender 29. Then, the control unit 13 adjusts the magnification of the variable power lens 23. The magnification of the variable power lens 23 depends on the inserted/extracted state of the extender 29. The above control achieves the instructed imaging magnification.

The above control can achieve the magnification instruction in such a manner that when the imaging magnification is instructed, the magnification converting lens is automatically inserted or extracted, and the magnification of the variable power lens is controlled according to the inserted/extracted state of the magnification converting lens. Thus, the operator can easily operate without considering the presence or absence of the magnification converting lens.

(12) The control unit 13 may switch the extender 29 in conjunction with at least one of the movement detection function, the error detection function, and the warning output function by the image process. The above configuration allows the movement detection, the error detection, and the warning output to be performed at an appropriate magnification. For example, movement detection accuracy can be improved by increasing the magnification at movement detection. This can increase detection accuracy and can ensure warning output operation.

(13) The permission to use the extender 29 may be restricted from the point of view of privacy protection. The permission to use the extender 29 may be set in advance by a high-level manager for each imaging apparatus, for each range of the angle of view, for each preset position and for each time schedule. Within the controlled range, the imaging apparatus may be controlled by a lower-level operator using the operation terminal or the like.

In order to restrict the permission to use the extender 29, a management table may be used. The management table may be stored in the imaging apparatus 1 and referred to by the control unit 13. The management table may be stored in the operation terminal 15 and used as operation permission. The management table manages passwords, users, or network clients.

In order to use for privacy protection, the switching timing of the extender 29 may be recorded together with the image. The switching timing is used to restrict the reproduction of an enlarged image using the extender 29. The recorded part of the enlarged image imaged by the extender 29 can be found from the recorded switching timing. In light of this, the record of the switching timing can be used to restrict the reproduction of the enlarged image. The reproduction restriction may be performed for each imaging apparatus, for each range of the angle of view, for each preset position and for each time schedule. As the reproduction restriction, a reproduction operation to the imaging apparatus 1 may be restricted. In addition, the reproduction using an external communication or an external terminal input may be restricted. The setting of the reproduction restriction may also be performed by the operation to the imaging apparatus 1 or may be performed by an external communication or an external terminal input.

Moreover, the management table may be used for the reproduction restriction and further the setting operation of the reproduction restriction may also be restricted by the management table. The management table manages passwords, users, or network clients. The management table may be used to determine the preset user privileges and to determine whether or not to permit the reproduction operation and the setting operation.

Hereinbefore, the imaging apparatus 1 according to the embodiments of the present invention has been described. The present embodiment changes the mask region in the image according to the magnification shift due to the switching of the magnification converting lens and maintains the privacy zone in a masked state even after the switching of the magnification converting lens. Thus, the above configuration can prevent the privacy zone from being shifted from the mask when the magnification converting lens is switched.

In addition, according to the present embodiment, when the magnification converting lens is switched during rotation of the imaging unit 3, the control unit 13 instructs the signal processing unit to change the position and the size of the mask region according to the imaging direction change and the magnification shift and maintain the object region to be masked before and after the switching of the magnification converting lens. According to the above configuration, even if the magnification converting lens is switched during rotation of the imaging unit 3 and the size and the position of the privacy zone are changed, the position and the size of the mask region are appropriately adjusted. Thus, the above configuration can prevent the privacy zone from being shifted from the mask when the magnification converting lens is switched.

Moreover, according to the present embodiment, when the magnification converting lens is switched, the control unit 13 instructs the signal processing unit on the imaging magnification and the imaging direction after the switching of the magnification converting lens, and the signal processing unit calculates, as the mask region, a relative region of the privacy zone to an imaging region after the switching of the magnification converting lens from the imaging magnification and the imaging direction after switching instructed by the control unit 13 and composites the mask to the calculated mask region. The above configuration can prevent the privacy zone from being shifted from the mask by appropriately changing the mask region when the magnification converting lens is switched.

Moreover, according to the present embodiment, during switching of the magnification converting lens, the control unit 13 outputs an image before switching recorded in the image recording unit 7 as an interpolated image and restricts mask movement in the interpolated image according to the rotation of the imaging unit 3 by the rotation mechanism 9. In the above configuration, during switching of the magnification converting lens, an image before switching recorded in the image recording unit 7 is outputted as an interpolated image. This can prevent an image taken by the magnification converting lens from being outputted and thus can output a natural image not providing the user with a feeling of strangeness. Further, during output of the interpolated image, the restriction of the mask movement according to the rotation of the imaging unit 3 can prevent the mask from being shifted from the privacy zone of the interpolated image.

Moreover, according to the present embodiment, the control unit 13 changes a size of the mask region a predetermined transient period earlier or later than the switching timing of the magnification converting lens 29 in such a manner that the size of the mask region is larger than the size of the object region of the privacy zone. The above configuration allows the size of the mask region to be surely larger than the size of the object region of the privacy zone and thus the privacy zone can be surely covered with the mask.

Moreover, according to the present embodiment, the control unit 13 is configured such that when the magnification converting lens is switched during rotation of the imaging unit 3, the rotation speed of the imaging unit 3 by the rotation mechanism 9 is changed according to the magnification shift so as to maintain an object movement speed in the image before and after the magnification converting lens is switched. The above configuration allows the user to feel equally easy to perform an operation of rotating the imaging unit 3 regardless of the presence or absence of the magnification converting lens.

Moreover, according to the present embodiment, the control unit 13 is configured such that when the magnification converting lens is switched during magnification change of the variable power lens 23, a magnification change speed of the variable power lens 23 is changed according to the magnification shift so as to maintain the object size change speed in the image before and after the magnification converting lens is changed. The above configuration allows the user to feel equally easy to perform a magnification change operation regardless of the presence or absence of the magnification converting lens.

Hereinbefore, the currently considered preferred embodiments of the present invention have been described. It is understood that various modifications can be made to the present embodiments and it is intended that the appended claims cover all such modifications as fall within the true spirit and scope of the present invention.

Industrial Applicability

Thus, the imaging apparatus according to the present invention can prevent the privacy zone from being shifted from the mask when the magnification converting lens is switched and is suitable for a security camera and like.

REFERENCE SIGNS LIST

1 Imaging apparatus
3 Imaging unit
5 Signal processing circuit
7 Image recording unit
9 Rotation mechanism
11 Sound collecting microphone
13 Control unit
15 Operation terminal
17 Image recording apparatus
19 Monitor
23 Variable power lens
29 Extender
31 Variable power lens drive unit
33 Variable power lens magnification sensor
35 Extender drive unit
37 Imaging element
41 Magnification instruction unit
43 Direction instruction unit
55 Mask data storage unit
57 Mask composition unit
61 Imaging region calculation unit
63 Mask region calculation unit
65 Size change unit

The invention claimed is:

1. An imaging apparatus comprising:
   an imaging unit having a magnification converting lens configured to switch between an inserted state and an extracted state with respect to an optical axis;
   a signal processing unit which composites a mask to an object region of a privacy zone in an image generated by the imaging unit; and
   a control unit which controls the signal processing unit according to switching of the magnification converting lens, wherein
      the control unit instructs, when the magnification converting lens is switched, the signal processing unit to change the mask region in the image according to a magnification shift caused by the switching of the magnification converting lens and maintains the privacy zone in a masked state after the switching of the magnification converting lens, and
   wherein the control unit increases a size of the mask region before the magnification converting lens switches between the inserted state and the extracted state.

2. The imaging apparatus according to claim 1, further comprising a rotation mechanism which rotates the imaging unit, wherein
   the control unit instructs, when the magnification converting lens is switched during rotation of the imaging unit, the signal processing unit to change a position and a size of the mask region according to an imaging direction change and the magnification shift and maintains an object region to be masked before and after the switching of the magnification converting lens.

3. The imaging apparatus according to claim 2, wherein the control unit instructs, when the magnification converting lens is switched, the signal processing unit on the imaging magnification and the imaging direction after the switching of the magnification converting lens, and
the signal processing unit calculates, as the mask region, a relative region of the privacy zone to an imaging region after the switching of the magnification converting lens from the imaging magnification and the imaging direction after switching instructed by the control unit and composites the mask to the calculated mask region.

4. The imaging apparatus according to claim 2, further comprising an image recording unit which records an image imaged by the imaging unit, wherein
the control unit controls the signal processing unit in such a manner that during switching of the magnification converting lens, an image before switching recorded in the image recording unit is outputted as an interpolated image and mask movement is restricted in the interpolated image according to the rotation of the imaging unit by the rotation mechanism.

5. The imaging apparatus according to claim 1, wherein the control unit decreases a size of the mask region after the magnification converting lens switches between the inserted state and the extracted state.

6. The imaging apparatus according to claim 2, wherein the control unit changes, when the magnification converting lens is switched during rotation of the imaging unit, the rotation speed of the imaging unit by the rotation mechanism according to the magnification shift and to maintain an object movement speed in the image before and after the magnification converting lens is switched.

7. The imaging apparatus according to claim 1, further comprising a variable power lens which continuously changes imaging magnification, wherein
the control unit changes, when the magnification converting lens is switched during magnification change of the variable power lens, a magnification change speed of the variable power lens according to the magnification shift and to maintain the object size change speed in the image before and after the magnification converting lens is changed.

8. The imaging apparatus according to claim 1, further comprising a sound collecting microphone which acquires a sound of the imaging region, wherein
the control unit controls at least one of a sensitivity and a directivity of the sound collecting microphone according to switching of the magnification converting lens.

9. The imaging apparatus according to claim 1, wherein the control unit suppresses at least one of a movement detection function, an error detection function, and a warning output function by an image process during the switching of the magnification converting lens.

10. The imaging apparatus according to claim 1, wherein the control unit performs a process to restrict recording an image during the switching of the magnification converting lens.

11. The imaging apparatus according to claim 1, wherein the control unit sends information indicating that the magnification converting lens is being switched according to switching of the magnification converting lens, together with the image to an outside.

12. The imaging apparatus according to claim 1, wherein the control unit records switching execution of the magnification converting lens.

13. The imaging apparatus according to claim 1, wherein the imaging unit. has a variable power lens which continuously changes the imaging magnification, and
the control unit controls the variable power lens according to switching of the magnification converting lens and maintains the imaging magnification when the magnification converting lens is switched.

14. The imaging apparatus according to claim 13, wherein the control unit inserts, when the imaging magnification reaches a predetermined threshold insertion magnification, the magnification converting lens; the control unit extracts, when the imaging magnification reaches a predetermined threshold extraction magnification, the magnification converting lens; and the threshold insertion magnification and the threshold extraction magnification are set differently.

15. The imaging apparatus according to claim 1, wherein the imaging unit has a variable power lens which continuously changes the imaging magnification,
the control unit receives a magnification instruction which instructs the imaging magnification, switches the magnification converting lens according to the magnification instruction based on preset switching control information associating the magnification instruction with whether to insert or extract the magnification converting lens, and controls the variable power lens according to the inserted/extracted state of the magnification converting lens and the magnification instruction.

16. The imaging apparatus according to claim 1, wherein the control unit switches the magnification converting lens in conjunction with at least one of a movement detection function, an error detection function, and a warning output function by an image process.

17. An imaging method in which an image is imaged by an imaging unit having a magnification converting lens configured to switch between an inserted state and an extracted state with respect to an optical axis and a mask is composited to an object region of a privacy zone in the image generated by the imaging unit, wherein
when the magnification converting lens is switched, a mask region in the image is changed according to a magnification shift caused by switching of the magnification converting lens, and the privacy zone is maintained in a masked state after the switching of the magnification converting lens, and
a size of the mask region is increased before the magnification converting lens switches between the inserted state and the extracted state.

18. The imaging apparatus according to claim 1, wherein the control unit makes the size of the mask region larger than the privacy zone before the magnification converting lens switches between the inserted state and the extracted state.

19. An imaging apparatus comprising:
an imaging unit having a magnification converting lens configured to switch between an inserted state and an extracted state with respect to an optical axis;
a signal processing unit which composites a mask to an object region of a privacy zone in an image generated by the imaging unit; and
a control unit which controls the signal processing unit according to switching of the magnification converting lens, wherein:
the control unit instructs, when the magnification converting lens is switched, the signal processing unit to change the mask region in the image according to a magnification shift caused by the switching of the magnification converting lens and maintains the privacy zone in a masked state after the switching of the magnification converting lens, the imaging unit has a variable power lens which continuously changes the imaging magnification, the control unit controls the variable power lens according to switching of the magnification converting lens and maintains the imaging magnification when the magnification converting lens is switched, the control unit inserts, when the imaging magnification reaches a predetermined threshold insertion magnification, the magnification converting lens, the control unit extracts, when the imaging magnification reaches a predetermined threshold extraction magnification, the magnification converting lens, and the threshold insertion magnification and the threshold extraction magnification are set to be different.

* * * * *